United States Patent
Yamauchi

(10) Patent No.: US 7,366,863 B2
(45) Date of Patent: Apr. 29, 2008

(54) MEMORY CONTROL APPARATUS, THE PROGRAM AND METHOD, AND REPRODUCTION APPARATUS

(75) Inventor: Yasuharu Yamauchi, Tokyo (JP)

(73) Assignee: Sony Corporation, Tokyo (JP)

( * ) Notice: Subject to any disclaimer, the term of this patent is extended or adjusted under 35 U.S.C. 154(b) by 274 days.

(21) Appl. No.: 11/196,439

(22) Filed: Aug. 4, 2005

(65) Prior Publication Data
US 2006/0053317 A1 Mar. 9, 2006

(30) Foreign Application Priority Data
Aug. 5, 2004 (JP) .............................. 2004-229621

(51) Int. Cl.
*G06F 13/00* (2006.01)
(52) U.S. Cl. ...................... 711/167; 713/300
(58) Field of Classification Search ................ 711/167; 713/300
See application file for complete search history.

(56) References Cited

U.S. PATENT DOCUMENTS 5,717,669 A * 2/1998 Kimura et al. ........... 369/30.27
6,954,550 B2 * 10/2005 Fujieda ....................... 382/199
2005/0036422 A1 * 2/2005 Sasaki ..................... 369/53.31
2006/0210246 A1 * 9/2006 Okauchi et al. .............. 386/95

FOREIGN PATENT DOCUMENTS

| JP | 11-238314 | 8/1999 |
| JP | 2000-311064 | 11/2000 |
| JP | 2001-76415 | 3/2001 |
| JP | 2001-176172 | 6/2001 |

* cited by examiner

*Primary Examiner*—Gary Portka
*Assistant Examiner*—Yong J. Choe
(74) *Attorney, Agent, or Firm*—Oblon, Spivak, McClelland, Maier & Neustadt, P.C.

(57) ABSTRACT

A reproduction apparatus capable of saving power consumption, wherein starting time data of a hard disk drive (HDD), is detected every time the HDD starts and, based on threshold value data generated by using a value obtained by adding standard deviation data to average value data of the starting time data, a timing of activating the HDD and starting an operation of writing song data read from the HDD to an SDRAM is determined.

20 Claims, 7 Drawing Sheets

MEMORY CONTROL APPARATUS, THE PROGRAM AND METHOD, AND REPRODUCTION APPARATUS

CROSS REFERENCES TO RELATED APPLICATIONS

The present invention contains subject matter related to Japanese Patent Application JP 2004-229621 filed in the Japanese Patent Office on Aug. 5, 2004 the entire contents of which being incorporated herein by reference.

BACKGROUND OF THE INVENTION

1. Field of the Invention

The present invention relates to a memory control apparatus, for example, for performing control of writing to a shock proof memory, a program thereof, a method thereof, and a reproduction apparatus.

2. Description of the Related Art

In recent years, along with an HDD becoming large in a recording capacity and development of compression techniques of music, moving pictures and still images, etc., an enormous amount of content data can be stored in a recording medium in a portable reproduction apparatus.

Such a portable reproduction apparatus reads data stored in an HDD as above and reproduces the same.

While the HDD has a large recording capacity, a reading error by the head may arise when a jolt is given.

In a portable device, to reproduce data at a constant rate even if such a reading error arises, data read from the HDD is temporarily stored in a semiconductor memory (shock proof memory) and the data is read and reproduced at a constant rate from the semiconductor memory.

Writing of data from the HDD to the semiconductor memory starts immediately before data stored in the semiconductor memory becomes empty to keep the HDD in a non-activated state for a long time in terms of saving power consumption.

Specifically, in the total time of a starting time that the HDD starts up from a non-activated state to an activated state and a reading time that data is actually read from the HDD in an activated state, by using a data amount read from the semiconductor memory as a threshold value, the portable reproducing device starts to write data from the HDD to the semiconductor memory at a timing that a data amount of data stored in the semiconductor memory becomes the threshold value or smaller.

In a portable reproduction apparatus of the related art, a maximum starting time regulated by a manufacturer of the HDD is used as the above starting time of the HDD.

SUMMARY OF THE INVENTION

The starting time of the HDD explained above, however, varies due to various factors.

Also, in terms of saving power consumption, there is a demand for securing a longer period for the HDD to be in a non-activated state comparing with that of the related art.

When data read from a memory means having a variable starting time is written in a memory circuit, from which data is read at a constant rate, it is desired to provide a memory control apparatus capable of saving power consumption by securing a longer non-activated state of the memory means, a program thereof, a method thereof and a reproduction apparatus.

According to the present invention, a memory control apparatus for saving power consumption when writing data read from the memory means having a variable starting time to the memory circuit, from which data is read at a constant rate, by securing a longer non-activated state of the memory means comparing with that in the related art, a program thereof, a method thereof and a reproduction apparatus can be provided.

The first aspect of the present invention is a memory control apparatus, comprising: a memory circuit for data read from a memory means to be written and stored data to be read out; a time detection means for detecting a starting time that said memory means becomes an activated state from a non-activated state; a threshold value determination means for determining a threshold value for determining a timing of starting writing of data to said memory circuit based on said starting time detected by said memory means; and a control means for bringing writing of data from said memory means to said memory circuit started.

The second aspect of the present invention is a memory control method for writing data read from a memory means having a variable starting time from a non-activated state to be an activated state to a memory circuit, from which data is read at a constant rate, including: a first step for detecting said starting time of said memory means; a second step for determining a threshold value indicating a data amount of data stored in said memory circuit used for determining a timing of starting writing of data to said memory circuit based on said starting time detected in said first step; and a third step for determining whether or not to start writing of data to said memory circuit based on a data amount of data stored in said memory circuit and said threshold value determined in said second step.

The thirds aspect of the present invention is a program to be executed by a computer for writing data read from a memory means having a variable starting time from a non-activated state to an activated state to a memory circuit, from which data is read at a constant rate, comprising: a first routine for detecting said starting time of said memory means; a second routine for determining a threshold value indicating a data amount of data stored in said memory circuit used for determining a timing of starting writing of data to said memory circuit based on said starting time detected in said first routine; and a third routine for determining whether or not to start writing of data to said memory circuit based on a data amount of data stored in said memory circuit and said threshold value determined in said second routine.

The fourth aspect of the present invention is a memory control apparatus, comprising: a memory circuit for data read from a memory means to be written and stored data to be read out; a time detection circuit for detecting a starting time that said memory circuit becomes an activated state from a non-activated state; a threshold value determination circuit for determining a threshold value for determining a timing of starting writing of data to said memory circuit based on said starting time detected by said memory circuit; and a control circuit for bringing writing of data from said memory circuit to said memory circuit started.

BRIEF DESCRIPTION OF DRAWINGS

These and other objects and features of the present invention will become clearer from the following description of the preferred embodiments given with reference to the attached drawings, in which.

DESCRIPTION OF THE PREFERRED EMBODIMENT

Figure 1:
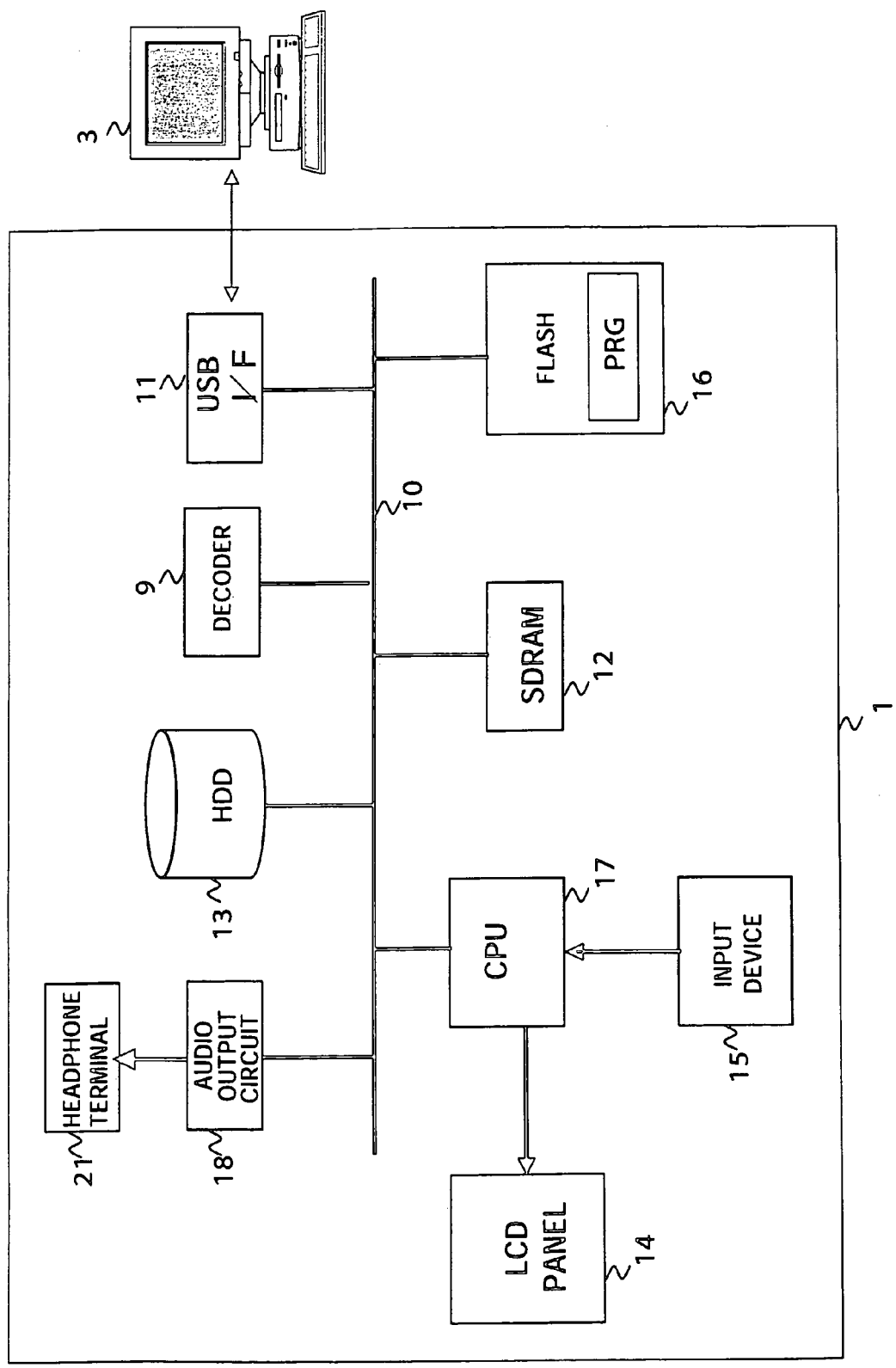
FIG. 1 is a view of the configuration of a reproduction apparatus according to an embodiment of the present invention.

FIG. 1 is a view of the configuration of a reproduction apparatus 1 according to an embodiment of the present invention.

The reproduction apparatus 1 is, for example, a portable audio reproduction apparatus.

As shown in FIG. 1, the portable audio reproduction apparatus 1 includes, for example, a USB (universal serial bus) interface 11, SDRAM (synchronous DRAM) 12, HDD (hard disk drive) 13, LCD (liquid crystal display) panel 14, input device 15, flash memory 16, CPU (central processing unit) 17 and audio output circuit 18.

The USB interface 11, SDRAM 12, HDD 13, flash memory 16, CPU 17 and audio output circuit 18 are connected, for example, by data lines 10.

Note that connection between the respective components in the portable audio reproduction device 1 is not limited to the example shown in FIG. 1.

The USB interface 11 is connected to a personal computer 3 and serves for inputting and outputting data to and from the personal computer 3.

The SDRAM 12 temporarily stores song data read from the HDD 13 by being controlled by the CPU 17.

The SDRAM 12 functions as a shock proof memory.

Specifically, song data is read from the HDD 13 and written to the SDRAM 12 by being controlled by the CPU 17.

Also, song data is read from the SDRAM 12 at a constant rate and output to the audio output circuit 18 by being controlled by the CPU 17.

In the HDD 13, the starting time from a non-activated state to an activated state varies due to a variety of factors.

The HDD 13 stores compressed song data (music data).

The song data is written from the personal computer 3 to the HDD 13 via the USB interface 11.

The HDD 13 has a memory capacity of, for example, 20 GB and song data in an amount of about 700 compact disks compressed by the ATRAC (adaptive transform acoustic coding) 3, etc. can be stored.

Each of song data in an amount of one song (hereinafter, also simply referred to as song data) stored in the HDD 13 is added with attribute data relating to an artist, album, style, group, new track and book mark, etc. thereof.

The artist attribute data indicates an artist playing the song of the song data, etc.

The album attribute data indicates an album, to which the song data belongs.

The style attribute data indicates a style of the song of the song data.

The group attribute data indicates that to which group regulated on the personal computer 3 the song data belongs.

The new track attribute data indicates whether this song data was input from the personal computer 3 at the time the reproduction apparatus 1 was connected to the personal computer 3 in the previous time or not.

The bookmark attribute data indicates whether the song data is bookmarked by the user or not.

The input device 15 is operation buttons, etc. and outputs an operation signal in response to an operation by the user to the CPU 17.

The flash memory 16 stores, for example, a program PRG for regulating an operation of the CPU 17.

The CPU 17 controls an overall operation of the reproduction apparatus 1 based on the program PRG read from the flash memory 16.

Below, processing relating to writing and reading to and from the SDRAM 12 by the CPU 17 will be explained.

First, a functional module to be realized as a result that the CPU 17 executes the program PRG read from the flash memory 16 will be explained.

Figure 2:
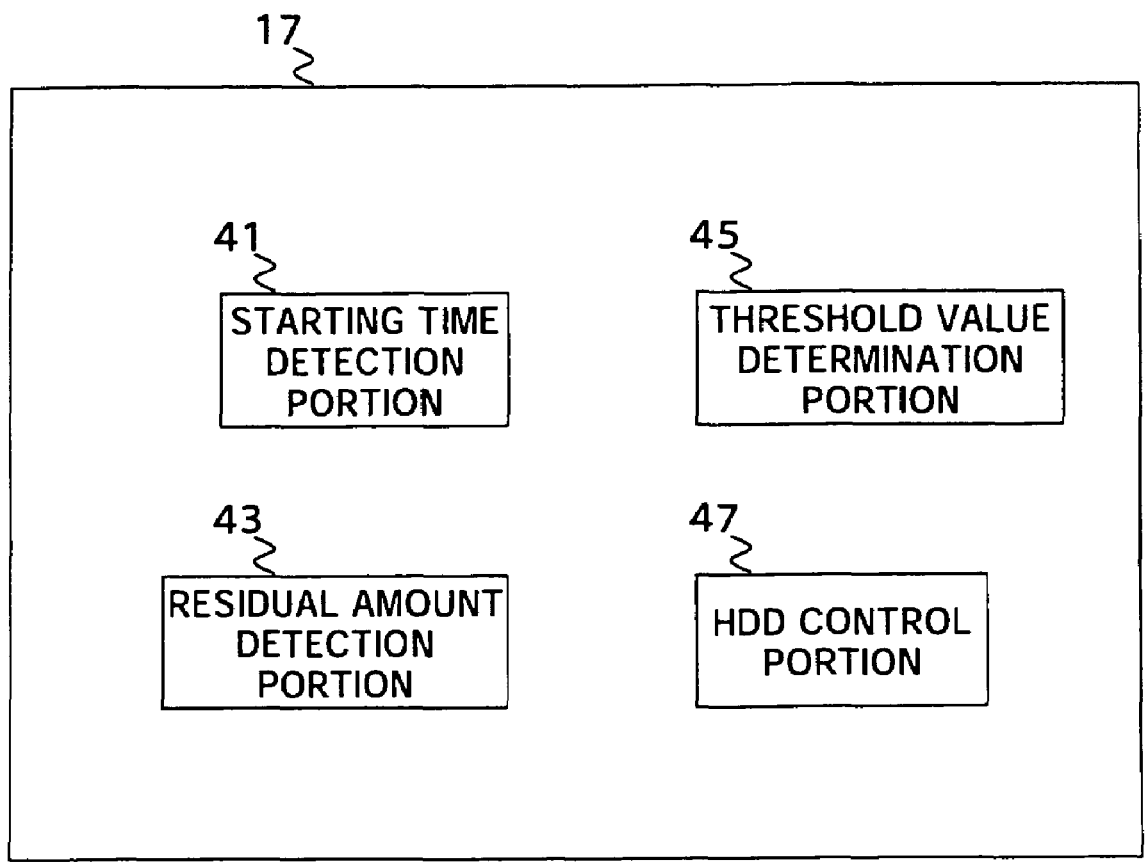
FIG. 2 is a view for explaining a function of a CPU shown in FIG. 1.
Figure 3:
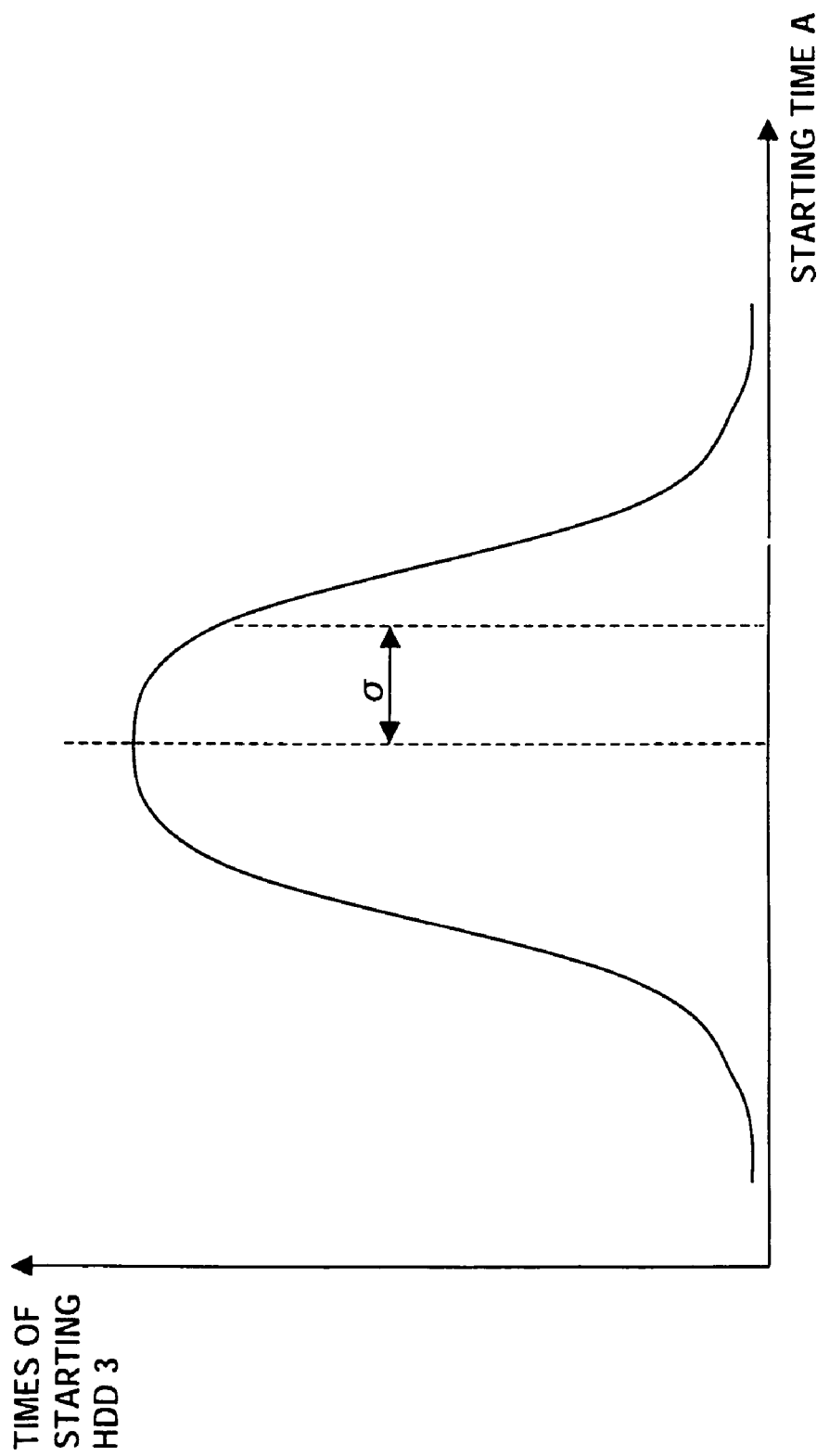
FIG. 3 is a view for explaining processing of a threshold value determination portion shown in FIG. 2.

As shown in FIG. 2, the CPU 17 realizes a functional module, for example, by a starting time detection portion 41, residual amount detection portion 43, threshold value determination portion 45 and control portion 47.

The starting time detection portion 41 detects a starting time data A indicating a starting time taken by the HDD 13 in its non-activated state to be an activated state every time the HDD 13 is activated.

Namely, when the HDD 13 is activated for a plurality of times, the starting time detection portion 41 detects the starting time data A for each time.

The residual detection portion 43 detects a data amount of song data stored in the SDRAM 12 and generates residual amount data indicating the detected data amount.

On an assumption that the starting time data A detected by the starting time detection portion 41 respectively for starting of the HDD 13 for a plurality of times as explained above follows a regular distribution, the threshold value determination portion 45 calculates the standard deviation data σ and average value data m.

Then, in the case where the residual data detected by the residual detection portion 43 has not indicated "0" in the past (the SDRAM 12 has never been empty), the threshold value determination portion 45 uses as new starting time data B a value obtained by adding the average value data m and the standard deviation data σ.

Note that the threshold value determination portion 45 generates starting time data B indicating a maximum starting time (for example, about 20 seconds) regulated by the manufacturer of the HDD 13 when generating first starting time data B.

Next, the threshold value determination portion 45 adds predetermined reading time data RT from activation of the HDD 13 until reading of the data to the starting time data B to generate threshold value time data THT.

Next, the threshold value determination portion 45 detects a data amount read form the SDRAM 12 within the time indicated by the threshold time data TH based on the reading rate of the SDRAM 12 and generates threshold value data TH indicating the detected data amount.

On the other hand, in the case where the residual amount data has indicated "0" in the past (the SDRAM 12 has been empty before), the threshold value determination portion 45 adds the standard deviation σ to the threshold value time data THT to generate new starting time data B as above.

The control portion 47 compares the residual amount data generated by the residual amount detection portion 43 with the threshold value data TH generated by the threshold value determination portion 45 and, when the residual amount data becomes the threshold value data TH or smaller, starts an operation of reading song data from the HDD 13 and writing to the SDRAM 12.

The control portion 47 reads song data from the SDRAM 12 at a constant rate and outputs to a decoder 9.

Also, when the control portion 47 detects that the residual amount data generated by the residual amount detection portion 43 reaches a memory capacity of the HDD 13, it stops the operation of reading song data from the HDD 13 and writing to the SDRAM 12.

Also, the CPU 17 displays a selection screen on the LCD panel 14.

The audio output circuit 18 decodes (reproduces) song data read from the SDRAM 12 to generate an audio signal and outputs the same to a headphone terminal 21.

Below, an operation example of the reproduction apparatus 1 shown in FIG. 1 will be explained.

FIRST OPERATION EXAMPLE

Below, an operation example of the reproduction apparatus 1 when the HDD 13 is activated will be explained.

Figure 4:
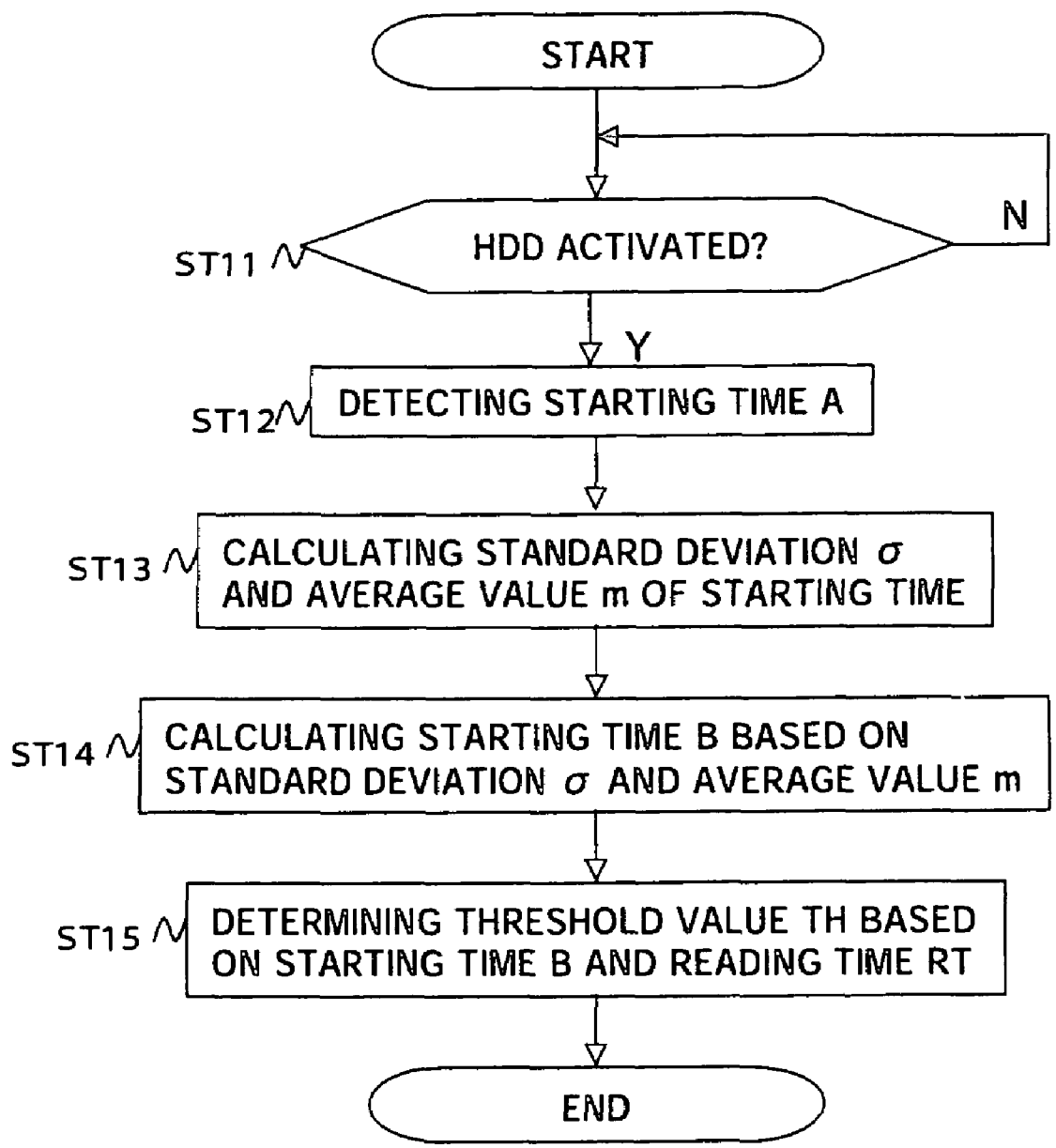
FIG. 4 is a flowchart for explaining an operation example of the reproduction apparatus when the HDD shown in FIG. 1 is activated.

FIG. 4 is a flowchart for explaining the operation example.

Step ST11:

The starting time detection portion 41 of the CPU 17 shown in FIG. 2 determines, for example, whether the HDD 13 is activated or not and, when determined that it is activated, proceeds to a step ST12 and, while not, repeats processing of the step ST11:

Step ST12:

The starting time detection portion 41 detects starting time data A indicating a starting time taken by the HDD 13 in a non-activated state to be in an activated state.

The starting time detection portion 41 stores the detected starting time data A.

Step ST13:

On an assumption that the starting time data A detected by the starting time detection portion 41 respectively for starting of the HDD 13 for a plurality of times as explained above follows a regular distribution, the threshold value determination portion 45 calculates the standard deviation data σ and average value data m.

Step ST14:

In the case where the residual amount data detected by the residual amount detection portion 43 has not indicated "0" in the past (the SDRAM 12 has never been empty), the threshold value determination portion 45 uses a value obtained by adding the standard deviation σ to the average value data m as new starting time data B.

On the other hand, in the case where the residual amount data detected by the residual amount detection portion 43 has indicated "0" (the SDRAM 12 has been empty before), the threshold value determination portion 45 adds the standard deviation σ to threshold value time data THT used in the previous time to generate new starting time data B as above.

Step ST15:

The threshold value determination portion 45 adds predetermined reading time data RT from starting of the HDD 13 until reading of the data to the starting time data B to generate threshold value time data THT.

Next, the threshold value determination portion 45 detects a data amount read from the SDRAM 12 within the time indicated by the threshold value time data THT based on the reading rate of the SDRAM 12, generates threshold value data TH indicating the detected data amount and stores the same.

SECOND OPERATION EXAMPLE

Below, an operation example of writing to the SDRAM 12 in the reproduction apparatus 1 will be explained.

Figure 5:
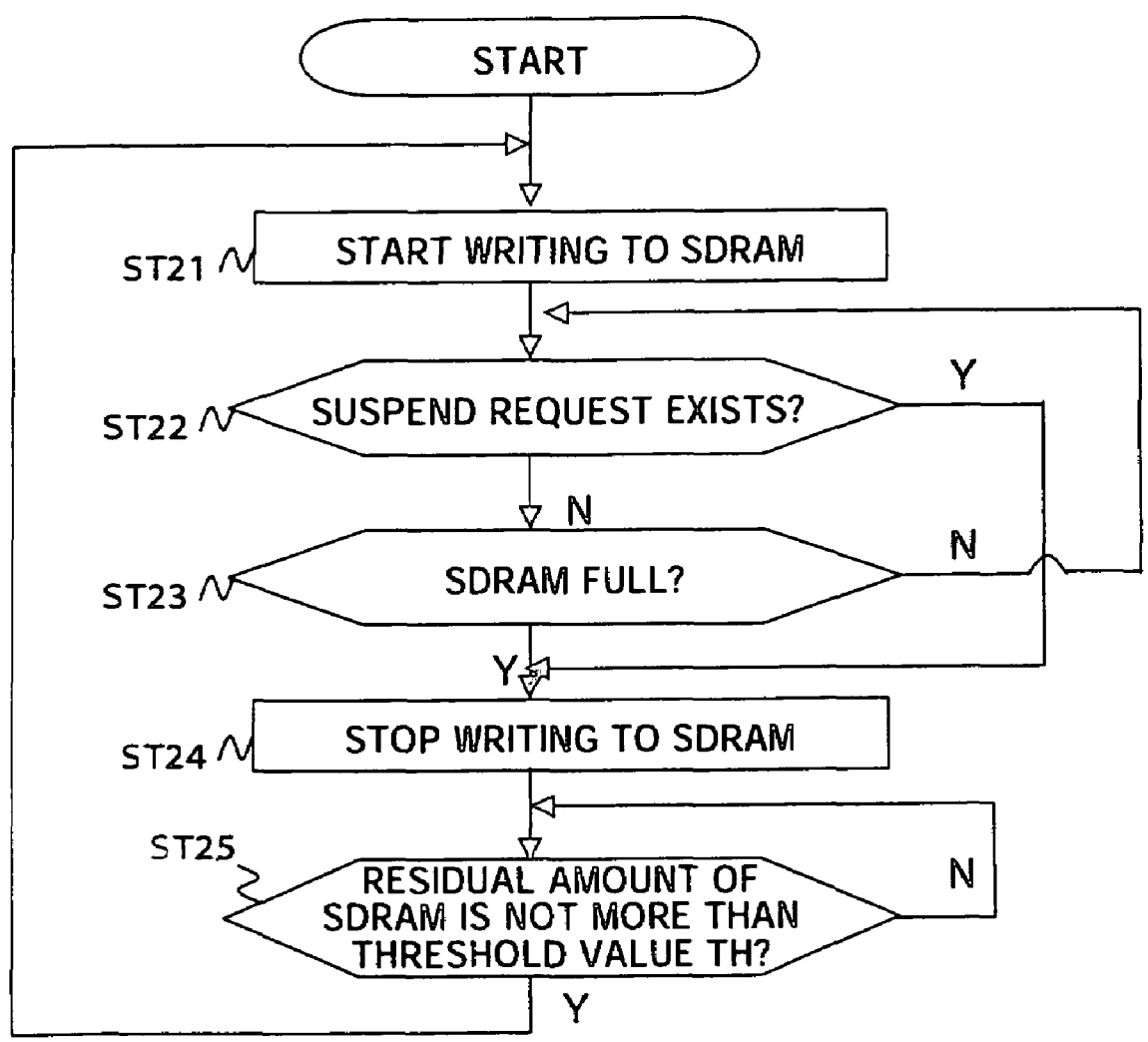
FIG. 5 is a flowchart for explaining an operation example of writing to an SDRAM in the reproduction apparatus shown in FIG. 1.

FIG. 5 is a flowchart for explaining the operation example.

Step ST21:

The control portion 47 of the CPU 17 shown in FIG. 2 makes the HDD 13 to be in an activated state, reads song data to be reproduced by the audio output circuit 18 from the HDD 13, and starts writing to the SDRAM 12.

Step ST22:

The control portion 47 determines whether a reproduction suspend request is input from the input device 15 or not and, when determined that it is input, proceeds to a step ST24 and, while not, proceeds to a step ST23.

Step ST23:

The control portion 47 determines whether song data in an amount of the memory capacity is stored in the SDRAM 12, that is, determines whether the SDRAM 12 is full or not based on the residual amount data of the SDRAM 12 detected by the residual amount detection portion 43 and, when determined that it is full, proceeds to a step ST24 and, while not, continues to write to the SDRAM 12 and returns back to the step ST11.

Step ST24:

The control portion 47 makes the HDD 13 to be in a non-activated state and stops writing of song data to the SDRAM 12.

Step ST 25:

Based on the residual amount data of the SDRAM 12 detected by the residual amount detection portion 43 and the threshold value data TH stored in the threshold value determination portion 45 by processing shown in FIG. 4, the control portion 47 determines whether the data amount stored in the SDRAM 12 is not more than the data amount indicated by the threshold value data TH and, when determined that it is not more than the data amount indicated by the threshold value data TH, returns back to the step ST21 and, while not, repeats processing in the step ST25.

As explained above, in the reproduction apparatus 1, starting time data A is detected every time the HDD 13 is activated and, based on the threshold value data TH generated by using a value obtained by adding standard deviation data σ to the average value data m, a timing of starting an operation of starting the HDD 13 and writing the song data read from the HDD 13 to the SDRAM 12 is determined.

At this time, in the reproduction apparatus 1, since the threshold value data TH is determined as explained above, the threshold value data TH can be made smaller comparing with that in the case of determining threshold value data TH_Prio based on the maximum starting time of the HDD in the related art.

Figure 6:
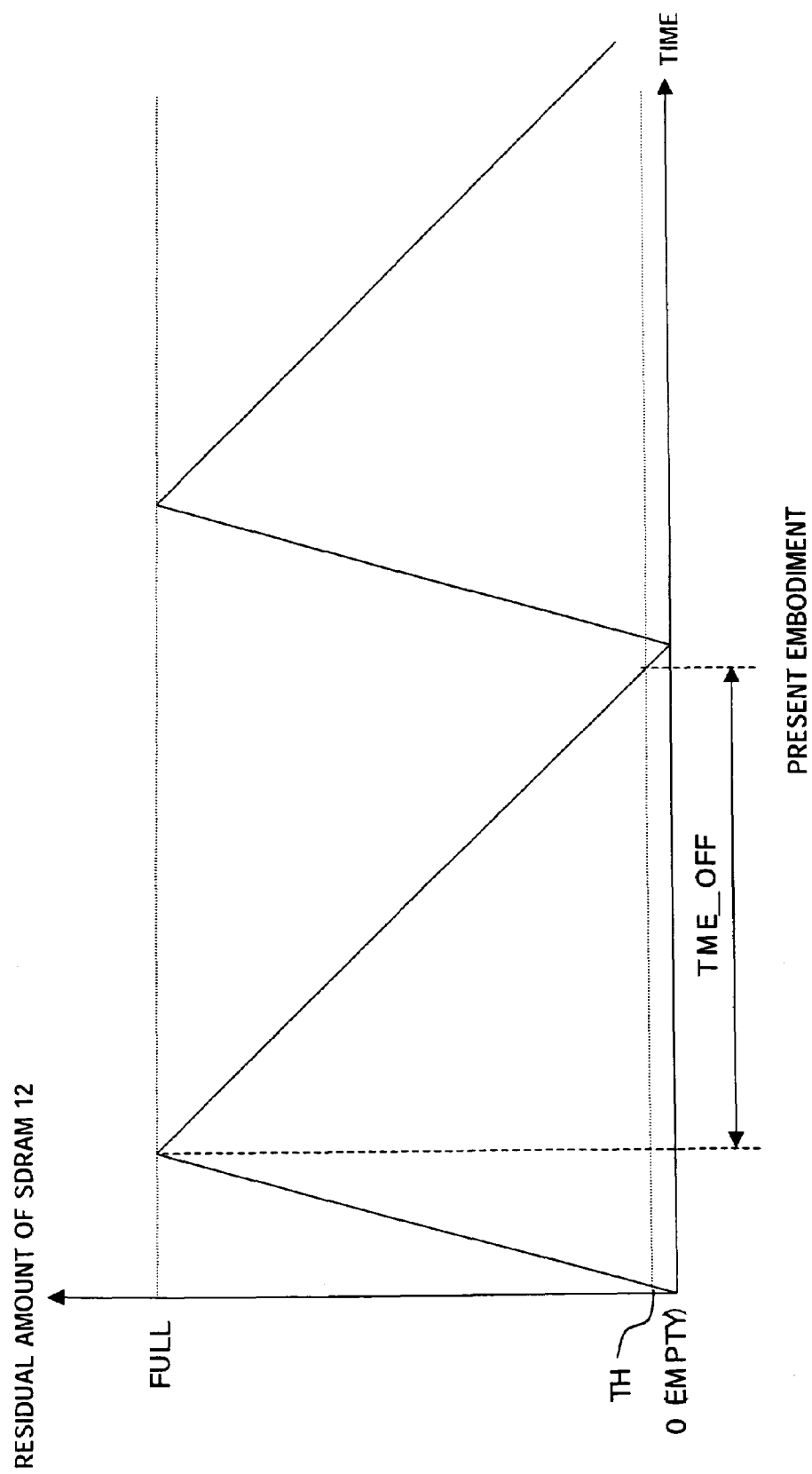
FIG. 6 is a view for explaining a non-activated time of the HDD in the reproduction apparatus shown in FIG. 1.
Figure 7:
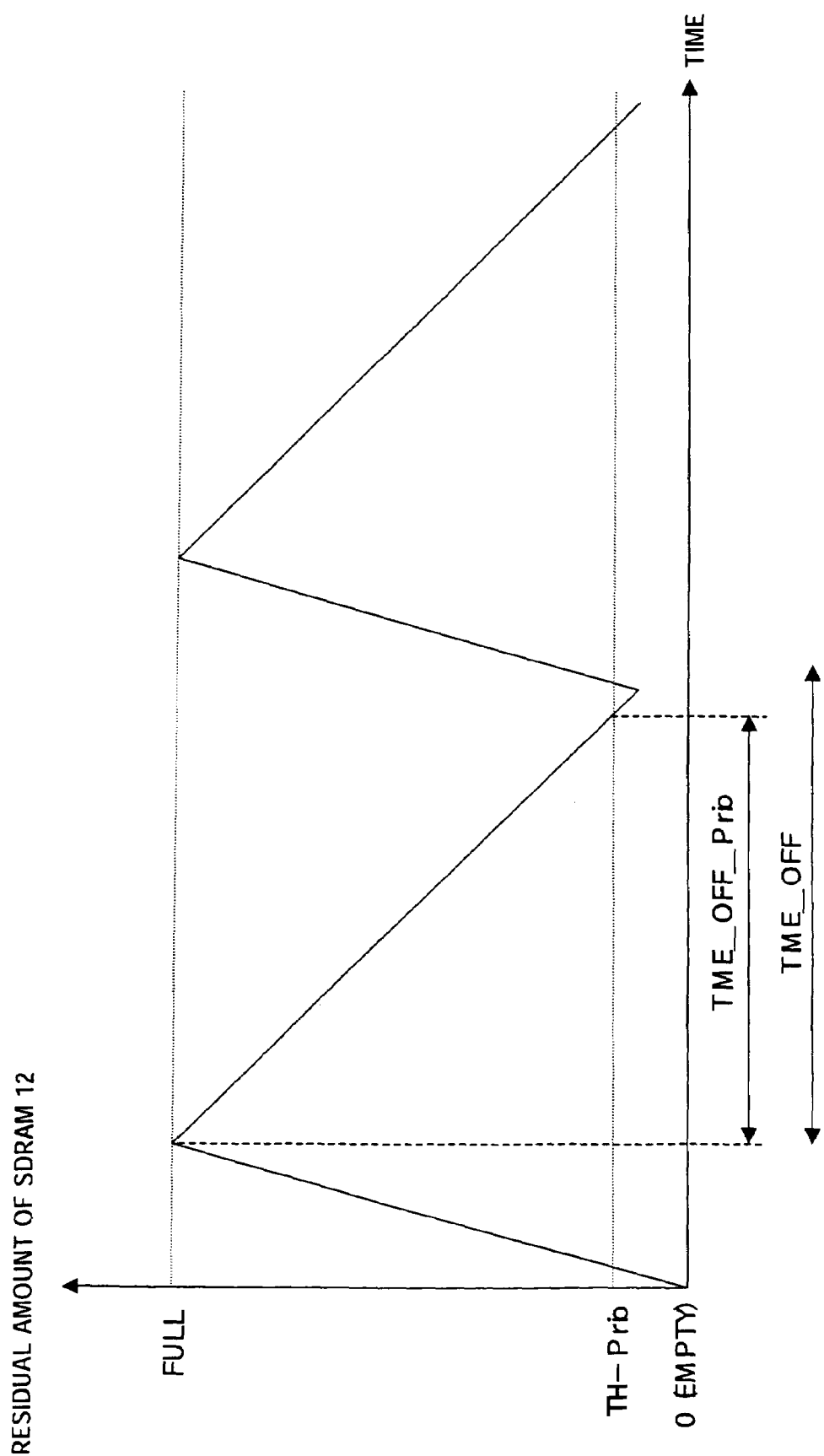
FIG. 7 is a view for explaining a non-activated time of an HDD in a reproduction apparatus of the related art.

As a result, according to the reproduction apparatus 1, non-starting time TIME_OFF of the HDD 13 after the data amount of the song data stored in the SDRAM 12 becomes full and the HDD 13 is made to be in a non-activated state until next starting of the HDD 13 based on the threshold value data TH becomes as shown in FIG. 6, which is longer than the non-starting time TIME_OFF_Prio of the related art shown in FIG. 7.

Therefore, according to the reproduction apparatus 1, power consumption can be saved comparing with the case of the related art, and it is particularly effective in the case of a portable type.

Also, in the reproduction apparatus 1, as explained above, in the case where the residual amount data detected by the residual amount detection portion 43 has indicated "0" in the past (the SDRAM 12 has been empty in the past), the threshold value determination portion 45 adds the standard deviation a to the threshold value time data THT used in the previous time to generate new starting time data B as above. Namely, the threshold value data TH is raised.

As a result, it is possible to prevent the situation that the SDRAM 12 becomes empty and song data cannot be output at a constant rate to the audio output circuit 18 from occurring continuously.

The present invention is not limited to the above embodiment.

In the above embodiment, the case of applying the present invention to a portable audio reproduction apparatus was described as an example, but the present invention can be applied to not portable apparatuses, such as a personal computer, etc.

Also, in the above embodiment, audio data, such as song data, was described as content data of the present invention, but video, picture and other image data may be also used.

Also, in the above embodiment, an HDD was described as an example of the memory means of the present invention, but it is not particularly limited as far as it is a memory means having a variable starting time from a non-activated state to an activated state. For example, an MD (registered trademark) and other magneto-optical recording media, CD-R (CD-recordable) and other semiconductor memories may be used.

Also, in the above embodiment, a portable audio reproduction apparatus was described as an example of the reproduction apparatus 1, but the reproduction apparatus 1 may be, for example, a personal computer, an optical disk reproduction apparatus for compact disks, etc. and a magneto-optical disk reproduction apparatus, etc.

The present invention can be applied to a system for, for example, controlling writing to a shock proof memory.

It should be understood by those skilled in the art that various modifications, combinations, sub-combinations and alternations may occur depending on design requirements and other factors insofar as they are within the scope of the appended claims or the equivalents thereof.

What is claimed is:

1. A memory control apparatus, comprising:
  a memory circuit for writing data read from a memory means and storing data to be read out;
  a time detection means for detecting a start time to switch said memory means to an activated state from a non-activated state;
  a threshold value determination means for determining a threshold value for determining the start time for writing data to said memory circuit based on said start time detected by said time detection means; and
  a control means for writing data from said memory means to said memory circuit, wherein
  said time detection means detects said start time every time said memory circuit is switched from said non-activated state to said activated state for a plurality of times; and
  said threshold value determination means calculates standard deviation σ and an average value m of a regular distribution regulated based on said start time detected by said time detection means respectively for said plurality of times and determines said threshold value based on a start time corresponding to a position of +σ with respect to said average value or on said regular distribution.

2. A memory control apparatus as set forth in claim 1, wherein said threshold value determination means determines said threshold values based on a predetermined read time after said memory circuit is switched to said activated state until data is read from the memory circuit.

3. A memory control apparatus as set forth in claim 2, wherein said threshold value determination means uses as said threshold value a data amount read from said memory circuit within a total time of said start time and said read time.

4. A memory control apparatus as set forth in claim 1, wherein, when a data amount of said data stored in said memory circuit becomes empty, said threshold value determination means determines said threshold value based on a start time corresponding to a position of +σ with respect to a position of said regular distribution used for determining said threshold in a previous time.

5. A memory control apparatus as set forth in claim 1, wherein, when a data amount stored in said memory circuit reaches a memory capacity of said memory circuit during writing data to said memory circuit, said control means stops writing data to said memory circuit and sets said memory circuit to a non-activated state.

6. A memory control apparatus as set forth in claim 1, wherein data read from said memory circuit is written in a shock proof memory.

7. A memory control apparatus as set forth in claim 1, further comprising said memory means.

8. A memory control apparatus as set forth in claim 1, further comprising an output means for outputting data read from said memory circuit.

9. A memory control apparatus as set forth in claim 8, wherein data to be stored in said memory means is audio data, and said output means is an audio output circuit.

10. A memory control apparatus as set forth in claim 9, wherein data to be stored in said memory means is compressed data, and said audio output circuit comprises a decoding circuit for decoding said compressed data.

11. A memory control method for determining whether or not to start writing data read from a memory unit having a variable start time from a non-activated state to an activated state to a memory circuit, from which data is read at a constant rate, the method comprising:
  detecting said variable start time of said memory unit;
  determining a threshold value indicating an amount of data stored in said memory circuit configured to determine a start time for writing data to said memory circuit based on said variable start time; and
  determining whether or not to start writing data to said memory circuit based on said amount of data stored in said memory circuit and said threshold value, wherein
  said detecting detects said variable start time every time said memory circuit is switched from said non-activated state to said activated state for a plurality of times; and
  said determining a threshold value calculates standard deviation a and an average value m of a regular distribution regulated based on said variable start time detected by said detecting respectively for said plurality of times and determines said threshold value based on a start time corresponding to a position of +σ with respect to said average value m on said regular distribution.

12. A computer readable storage medium encoded with a computer program configured to cause an information processing apparatus to execute a method for determining whether or not to start writing data read from a memory unit having a variable start time from a non-activated state to an activated state to a memory circuit, from which data is read at a constant rate, the method comprising:

detecting said variable start time of said memory unit;

determining a threshold value indicating an amount of data stored in said memory circuit configured to determine a start time for writing data to said memory circuit based on said variable start time; and determining whether or not to start writing data to said memory circuit based on said amount of data stored in said memory circuit and said threshold value, wherein said detecting detects said variable start time every time said memory circuit is switched from said non-activated state to said activated state for a plurality of times; and said determining a threshold value calculates standard deviation σ and an average value m of a regular distribution regulated based on said variable start time detected by said detecting respectively for said plurality of times and determines said threshold value based on a variable start time corresponding to a position of +σ with respect to said average value m on said regular distribution.

13. A memory control apparatus, comprising:

a memory circuit configured to write data read from a memory unit and configured to store data to be read out;

a time detection circuit configured to detect a start time that said memory circuit is switched to an activated state from a non-activated state;

a threshold value determination circuit configured to determine a threshold value used to determine a start time for writing data to said memory circuit based on said start time detected by said time detection circuit; and a control circuit configured to write data from said memory circuit to said memory circuit, wherein said time detection circuit is configured to detect said start time every time said memory circuit is switched from said non-activated state to said activated state for a plurality of times; and said threshold value determination circuit is configured to calculate standard deviation σ and an avenge value m of a regular distribution regulated based on said start time detected by said time detection circuit respectively for said plurality of times and to determine said threshold value based on a starting time corresponding to a position of +σ with respect to said average value m on said regular distribution.

14. A memory control apparatus as set forth in claim 1, further comprising a USB port.

15. A memory control apparatus as set forth in claim 14, wherein said USB port is in communication with a CPU.

16. A memory control apparatus as set forth in claim 1, further comprising an LCD panel.

17. A memory control apparatus as set forth in claim 1, wherein writing data includes portable audio reproduction.

18. A memory control apparatus as set forth in claim 1, wherein said memory means is a hard disk drive.

19. A memory control apparatus as set forth in claim 1, wherein said memory circuit is an SDRAM.

20. A memory control apparatus as set forth in claim 8, wherein said output means decodes data read from said memory circuit to generate an audio signal and outputs the audio signal to a headphone terminal.

* * * * *

UNITED STATES PATENT AND TRADEMARK OFFICE
CERTIFICATE OF CORRECTION

PATENT NO. : 7,366,863 B2
APPLICATION NO. : 11/196439
DATED : April 29, 2008
INVENTOR(S) : Yasuharu Yamauchi It is certified that error appears in the above-identified patent and that said Letters Patent is hereby corrected as shown below:

Column 7, line 13, change "a" to --σ--.

Column 8, line 7, change "or" to --m--;

line 65, change "a" to --σ--. (First occurrence)

Signed and Sealed this

Eighteenth Day of November, 2008

JON W. DUDAS
*Director of the United States Patent and Trademark Office*